United States Patent [19]

Sugiyama

[11] Patent Number: 4,907,073

[45] Date of Patent: Mar. 6, 1990

[54] ADAPTIVE DEVICE FOR SEPARATING LUMINANCE SIGNAL AND COLOR SIGNAL

[75] Inventor: Kenji Sugiyama, Noda, Japan

[73] Assignee: Victor Company of Japan, Ltd., Yokohama, Japan

[21] Appl. No.: 281,773

[22] Filed: Dec. 8, 1988

[30] Foreign Application Priority Data

Dec. 18, 1987 [JP] Japan .................. 62-320965

[51] Int. Cl.⁴ ............................... H04N 9/78
[52] U.S. Cl. .......................... 358/31; 358/40
[58] Field of Search ..................... 358/31, 40

[56] References Cited

U.S. PATENT DOCUMENTS

| 4,179,705 | 12/1979 | Faroudja | 358/31 |
| 4,205,335 | 5/1980 | Nakagawa | 358/31 |
| 4,240,105 | 12/1980 | Faroudja | 358/31 |
| 4,847,682 | 7/1989 | Tsinberg | 358/31 |

FOREIGN PATENT DOCUMENTS

| 60-165889 | 8/1985 | Japan . | |
| 226292 | 11/1985 | Japan | 358/31 |
| 186095 | 8/1986 | Japan | 358/31 |
| 2067872 | 7/1981 | United Kingdom | 358/31 |
| 2116393 | 9/1983 | United Kingdom | 358/31 |

Primary Examiner—Tommy P. Chin
Attorney, Agent, or Firm—Lowe, Price, LeBlanc, Becker & Shur

[57] ABSTRACT

A combination of a variable vertical-direction band pass filter and a variable horizontal-direction band pass filter extracts a color signal from a composite color signal. A vertical-direction variation detector detects a difference between levels of the composite color signal at sampling points separated vertically in a picture. A horizontal-direction variation detector detects a difference between levels of the composite color signal at sampling points separated horizontally in a picture. Pass bands of the vertical-direction band pass filter and the horizontal-direction band pass filter are controlled in accordance with output signals from the vertical-direction variation detector and the horizontal-direction variation detector. A luminance signal is derived from the composite color signal and the color signal.

6 Claims, 5 Drawing Sheets

ADAPTIVE DEVICE FOR SEPARATING LUMINANCE SIGNAL AND COLOR SIGNAL

BACKGROUND OF THE INVENTION

1. Field of the Invention

This invention relates to an adaptive device for separating a luminance signal and a color signal in color video systems such as color television receivers. Such a device is generally called a Y-signal/C-signal separation filter.

2. Description of the Prior Art

In recent color television receivers, a fixed-type two-dimensional filter using a comb filter is generally used to separately derive a luminance signal (Y signal) and a color signal (a carrier chrominance signal, C signal) from a composite color television signal.

Japanese published unexamined patent application No. 60-165889 discloses an adaptive comb filter for separating a luminance signal and a color signal. In the adaptive comb filter of Japanese application No. 60-165889, characteristics of a two-dimensional filter element are changed in accordance with conditions of adjacent picture elements.

The adaptive comb filter of Japanese application No. 60-165889 includes two different filter elements, that is, a vertical direction separation filter and a horizontal direction separation filter, each separately deriving a luminance signal and a color signal from a digitized composite color television signal. In the case where a given area surrounding a picture element has a smaller data variation in a vertical direction than a data variation in a horizontal direction, a luminance signal and a color signal outputted from the vertical direction separation filter are selected. In the opposite case, a luminance signal and a color signal outputted from the horizontal direction separation filter are selected. This selective change of the filter characteristics enables accurate separation of the luminance signal and the color signal in abruptly-varying portions of a picture, so that dot interference and cross color can be decreased.

In the adaptive comb filter of Japanese application No. 60-165889, since the filter characteristics are changeable between only two states and these states are extremely different, a luminance signal and a color signal become considerably discontinuous in waveform and are thus contaminated by noises at moments corresponding to changes of the filter characteristics. In regions where the degrees of variations in the vertical and horizontal directions are similar so that the filter characteristics are frequently changed, such noises are conspicuous.

In the adaptive comb filter of Japanese application No. 60-165889, when the vertical direction separation filter is selected, the band of the luminance signal in the vertical direction is limited regardless of that in the horizontal direction. When the horizontal direction separation filter is selected, the band of the luminance signal in the horizontal direction is limited regardless of that in the vertical direction. Accordingly, the band of the luminance signal is sometimes decreased to a region without the color signal so that the resolution tends to be lowered.

In regions which have considerable variations in both of the vertical and horizontal directions, the adaptive comb filter of Japanese application No. 60-165889 causes the band of the color signal in one of the two directions to be widened so that cross color tends to be generated at an unacceptable level.

SUMMARY OF THE INVENTION

It is an object of this invention to provide a reliable adaptive device for separating a luminance signal and a color signal.

In an adaptive device for separating a luminance signal and a color signal according to this invention, a combination of a variable vertical-direction band pass filter and a variable horizontal-direction band pass filter extracts a color signal from a composite color signal. A vertical-direction variation detector detects a difference between levels of the composite color signal at sampling points separated vertically in a picture. A horizontal-direction variation detector detects a difference between levels of the composite color signal at sampling points separated horizontally in a picture. Pass bands of the vertical-direction band pass filter and the horizontal-direction band pass filter are controlled in accordance with output signals from the vertical-direction variation detector and the horizontal-direction variation detector. A luminance signal is derived from the composite color signal and the color signal.

DESCRIPTION OF THE PREFERRED EMBODIMENT

Figure 1:
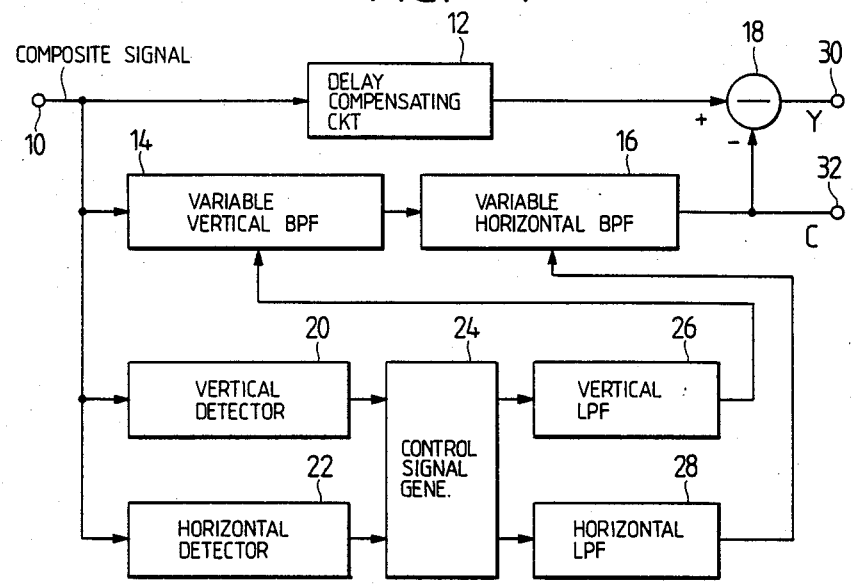
FIG. 1 is a block diagram of an adaptive device for separating a luminance signal and a color signal according to an embodiment of this invention.

With reference to FIG. 1, an input terminal 10 is subjected to a digital composite color television signal which is derived from an analog composite color television signal by an analog-to-digital (A/D) converter (not shown). The A/D converter samples the analog composite color television signal at a predetermined sampling period T and sequentially converts sampled levels into corresponding digital data. The digital composite color television signal is fed via the input terminal 10 to a delay compensating circuit 12, a vertical direction digital band pass filter (BPF) 14 of a variable type, a vertical direction variation detector 20, and a horizontal direction variation detector 22.

An output signal from the delay compensating circuit 12 which is derived from the input composite color television signal through a delay compensating process is applied to a plus input terminal of a subtracter 18. As will be described hereinafter, a minus input terminal of the subtracter 18 is subjected to a color signal (C signal). The delay compensating circuit 12 remove a phase difference or delay time difference between the color signal applied to the subtracter 18 and the color signal components in the composite signal applied to the subtracter 18 so that the subtracter 18 can extract accurate luminance signal (Y signal) components.

The vertical direction BPF 14 is connected in cascade with a horizontal direction digital band pass filter (BPF) 16 of a variable type. The digital composite color video signal is processed successively by the vertical direction BPF 14 and the horizontal direction BPF 16 into a color signal (a carrier chrominance signal) C. The color signal C is applied to a minus input terminal of the subtracter 18 and an output terminal 32.

The subtracter 18 generates a luminance signal Y in accordance with the output signal from the delay compensating circuit 12 and the color signal C. Specifically, the luminance signal Y corresponds to data which are equal to data of the output signal from the delay compensating circuit 12 minus data of the color signal C.

The vertical direction variation detector 20 calculates the difference between data at vertically separated sampling points in a picture and generates a signal representative of the calculated difference. The output signal from the detector 20 is fed to a control signal generator 24. The horizontal direction variation detector 22 calculates the difference between data at horizontally separated sampling points in a picture and generates a signal representative of the calculated difference. The output signal from the detector 22 is fed to the control signal generator 24.

The control signal generator 24 generate two primary control signals on the basis of the output signals from the detectors 20 and 22. A vertical direction low pass filter (LPF) 26 and a horizontal direction low pass filter (LPF) 28 process the primary control signals into final control signals which are fed to the vertical direction BPF 14 and the horizontal direction BPF 16 respectively. Characteristics of the vertical direction BPF 14 are varied in accordance with the related final control signal. Characteristics of the horizontal direction BPF 16 are varied in accordance with the related final control signal.

Figure 2:
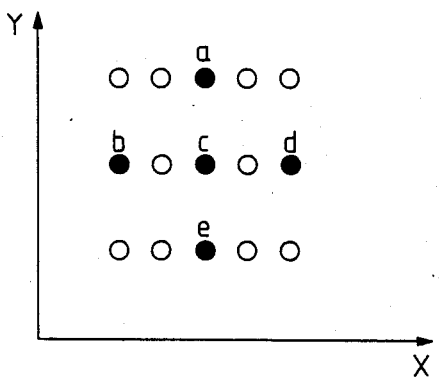
FIG. 2 is a diagram of an arrangement of sampling points in the case of an NTSC signal.

An NTSC composite color signal is sampled at a frequency which equals four times the color subcarrier frequency. As shown in FIG. 2, the sampled data series takes a two-dimensional arrangement in a picture screen. In FIG. 2, black and white circles denote respective sampling points.

The vertical direction variation detector 20 and the horizontal direction variation detector 22 are designed so that they are insensitive to the color subcarrier which is a dc component of the color signal. Specifically, in respect of the data at the point "c" of FIG. 2, the vertical direction variation detector 20 calculates the absolute value of the difference between the data at the points "a" and "e" of FIG. 2. In respect of the data at the point "c" of FIG. 2, the horizontal direction variation detector 22 calculates the absolute value of the difference between the data at the points "b" and "d" of FIG. 2.

Figure 3:
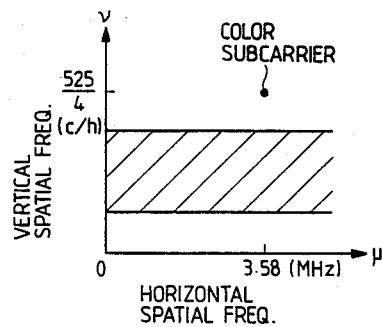
FIG. 3 is a diagram showing a two-dimensional spatial frequency range detected by the vertical direction variation detector of FIG. 1.
Figure 4:
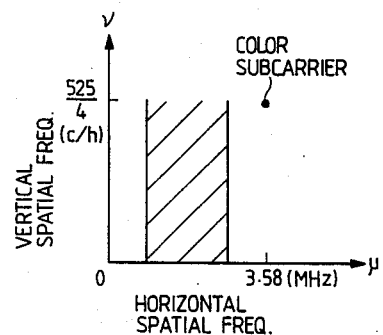
FIG. 4 is a diagram showing a two-dimensional spatial frequency range detected by the horizontal direction variation detector of FIG. 1.

FIG. 3 shows characteristics of the vertical direction variation detector 20. In FIG. 3, the hatched region corresponds to the spatial frequency range detected by the vertical direction variation detector 20. FIG. 4 shows characteristics of the horizontal direction variation detector 22. In FIG. 4, the hatched region corresponds to the spatial frequency range detected by the horizontal direction variation detector 22. As understood from FIGS. 3 and 4, the detected spatial frequency ranges extend outside the point of the color subcarrier. In addition, as understood from FIGS. 3 and 4, high frequency components of the luminance signal and also high frequency components of the color signal can be detected. In FIGS. 3 and 4, the vertical spatial frequency is represented in unit of cycle/height (c/h).

Figure 5:
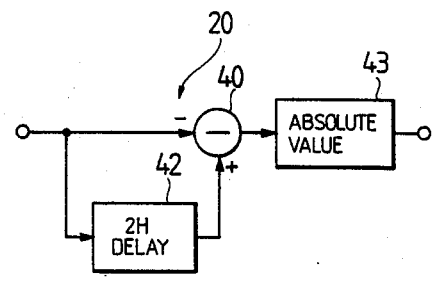
FIG. 5 is a block diagram of the vertical direction variation detector of FIG. 1.

As shown in FIG. 5, the vertical direction variation detector 20 includes a subtracter 40, a two-line delay circuit 42, and an absolute-value converter 43. The composite color television signal is applied to a minus input terminal of the subtracter 40 and an input terminal of the delay circuit 42. An output signal from the delay circuit 42 is applied to a plus input terminal of the subtracter 40. The delay circuit 42 delays the input composite color television signal by a period corresponding to two horizontal scanning periods (2H). The subtracter 40 calculates the difference between the non-delayed signal and the delayed signal which corresponds to the difference between the data at the points "a" and "e" of FIG. 2. The absolute-value converter 43 outputs an absolute value of the input data thereto. An output signal from the absolute-value converter 43 is fed to the control signal generator 24 (see FIG. 1).

Figure 6:
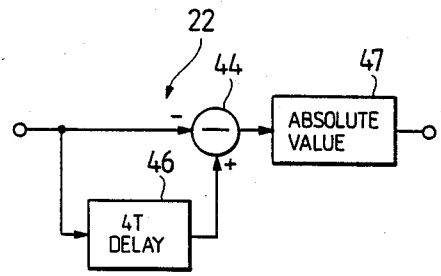
FIG. 6 is a block diagram of the horizontal direction variation detector of FIG. 1.

As shown in FIG. 6, the horizontal direction variation detector 22 includes a subtracter 44, a four-sample delay circuit 46, and an absolute-value converter 47. The composite color television signal is applied to a minus input terminal of the subtracter 44 and an input terminal of the delay circuit 46. An output signal from the delay circuit 46 is applied to a plus input terminal of the subtracter 44. The delay circuit 46 delays the input composite color television signal by a period corresponding to four sampling periods (4T). The subtracter 44 calculates the difference between the non-delayed signal and the delayed signal which corresponds to the difference between the data at the points "b" and "d" of FIG. 2. The absolute-value converter 47 determines the absolute value of the data difference outputted from the subtracter 44. An output signal from the absolute-value converter 47 which represents the calculated absolute value is fed to the control signal generator 24 (see FIG. 1).

Figure 7:
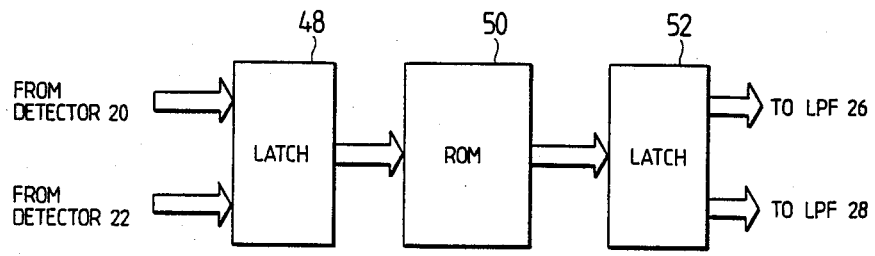
FIG. 7 is a block diagram of the control signal generator of FIG. 1.

As shown in FIG. 7, the control signal generator 24 includes latches 48 and 52, and a read-only memory (ROM) 50. The latch 48 receives data from the variation detectors 22 and 24. The data fed from each of the variation detectors 22 and 24 to the latch 48 have a plurality of bits, for example, 6 bits. The latch 48 combines the received data into an address signal outputted to the ROM 50. The address signal has a plurality of bits, for example, 12 bits. A set of predetermined control signal data are stored in respective storage locations of the ROM 50. The control signal data are read out from the storage location of the ROM 50 which is designated by the address signal fed from the latch 48. Accordingly, the ROM 50 generates the control signal data in accordance with the output signals from the variation detectors 20 and 22. The control signal data are transferred from the ROM 50 to the latch 52. The latch 52 divides the received control signal data into two primary control signals which are fed to the low pass filters 26 and 28 respectively. The control signal data preferably have four or more bits. In the case where the control signal data have 8 bits, each of the primary control signals has 4 bits.

The vertical direction BPF 14, the horizontal direction BPF 16, and the control signal data outputted from the ROM 50 are designed so that the characteristics of the BPFs 14 and 16 will depend on the differences or variations detected by the variation detectors 20 and 22 in the following manner. In the case where the data difference in the vertical direction is greater than the data difference in the horizontal direction, the pass band of the vertical direction BPF 14 is widened while the pass band of the horizontal direction BPF 16 is narrowed. In the opposite case, the pass band of the vertical direction BPF 14 is narrowed while the pass band of the horizontal direction BPF 16 is widened. In the case where the data difference in the vertical direction and the data difference in the horizontal direction are substantially equal, the pass pands of the BPFs 14 and 16 are made similar to each other. Since each of the control signals to the BPFs 14 and 16 has a plurality bits as understood from the previous description, the characteristics of the BPFs 14 and 16 can be varied among closely different multi-states. Accordingly, it is possible to finely and smoothly control the characteristics of the BPFs 14 and 16.

Generally, in cases where both of a variation in the vertical direction and a variation in the horizontal direction are great, cross color tends to occur. Accordingly, in such cases, both of the pass bands of the BPFs 14 and 16 are narrowed to adequately suppress the cross color. When both of the luminance and the color vary greatly, the narrow pass bands of the BPFs 14 and 16 cause a narrow color band and increase dot interference. Generally, in a picture pattern having such great variations in luminance and color, the narrow color band and the dot interference are masked by variations in the luminance signal and are thus inconspicuous while the cross color is conspicuous. In view of this fact, the BPFs 14 and 16 are controlled mainly to suppress the cross color.

Figure 8:
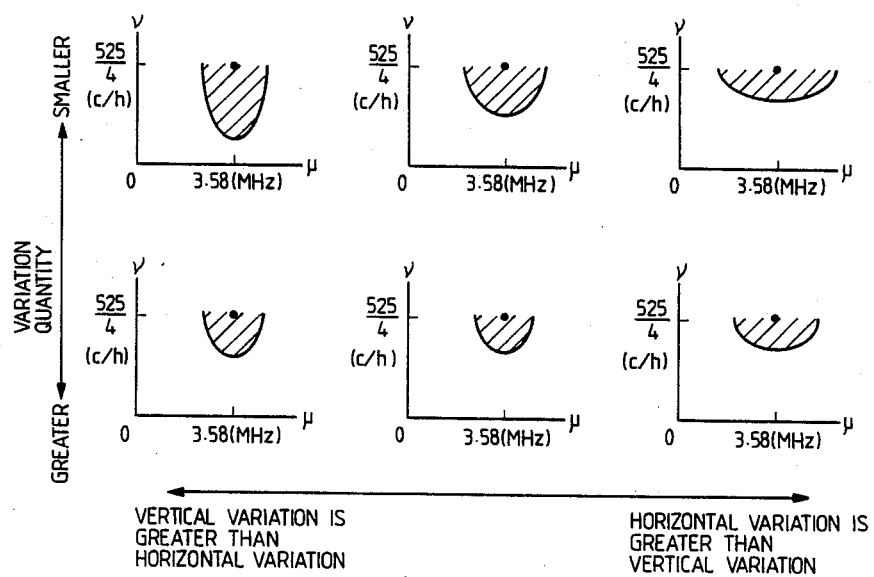
FIG. 8 is diagrams showing pass bands of a two-dimensional filter composed of the vertical direction band pass filter and the horizontal direction band pass filter of FIG. 1.

The BPFs 14 and 16 form a variable two-dimensional BPF. FIG. 8 contains graphs in which the hatched regions denote the pass bands of the two dimensional BPF. In each of the graphs of FIG. 8, the abscissa corresponds to the horizontal spatial frequency and the ordinate corresponds to the vertical spatial frequency. As shown in FIG. 8, the pass band of the two dimensional BPF depends on the difference between the variations in the vertical and horizontal directions and on the degrees of the variations.

As described previously, the vertical direction LPF 26 and the horizontal direction LPF 28 process the primary control signals into the final control signals fed to the vertical direction BPF 14 and the horizontal direction BPF 16 respectively. The characteristics of the LPFs 26 and 28 are designed so as to depend on the directions along which the BPFs 14 and 16 filter the signals, that is, the objective directions of filtering in the BPFs 14 and 16 respectively. This design of the LPFs 26 and 28 allows a smooth variation in the characteristics of the BPFs 14 and 16 and also prevents the filtered signals from being unacceptably discontinuous. In this way, the control signal to the vertical direction BPF 14 undergoes a low pass filtering process in the vertical direction while the control signal to the horizontal direction BPF 16 undergoes a low pass filtering process in the horizontal direction. Accordingly, the characteristics of the vertical direction BPF 14 are sensitively and promptly varied in accordance with the picture in the horizontal direction and are gradually varied in accordance with the picture in the vertical direction. The characteristics of the horizontal direction BPF 16 are sensitively and promptly varied in accordance with picture in the vertical direction and are gradually varied in accordance with the picture in the horizontal direction.

Figure 9:
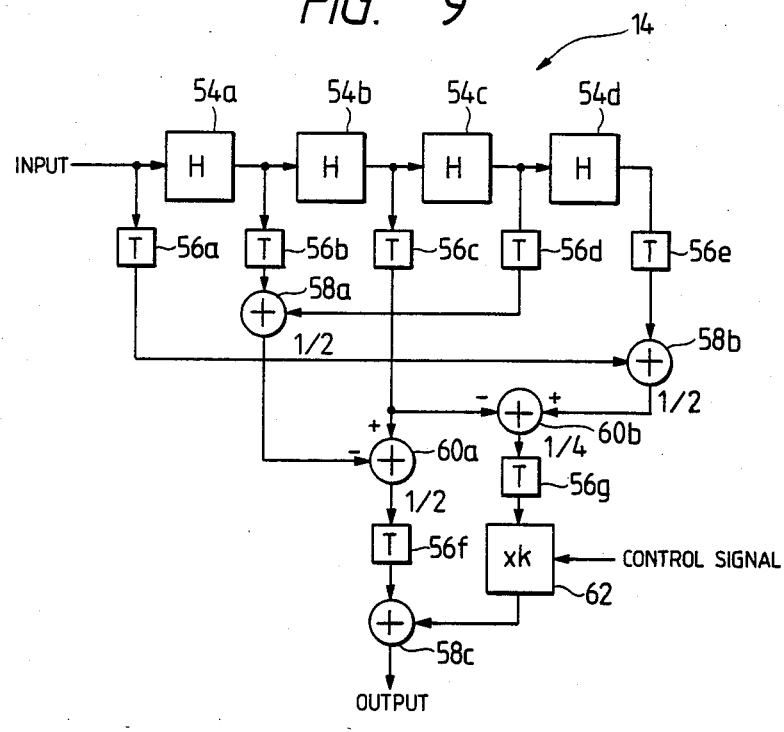
FIG. 9 is a block diagram of the vertical direction band pass filter of FIG. 1.

As shown in FIG. 9, the vertical direction BPF 14 includes a one-line delay circuit 54a and a one-sample delay circuit 56a into which the composite color television signal is inputted. The delay circuit 54a delays the input signal by a period corresponding to one horizontal scanning period (1H). The delay circuit 56a delays the input signal by a period corresponding to one sampling period (1T). The output signal from the delay circuit 54a is fed to a one-line delay circuit 54b and a one-sample delay circuit 56b. The delay circuit 54b delays the input signal by a period corresponding to one horizontal scanning period (1H). The delay circuit 56b delays the input signal by a period corresponding to one sampling period (1T). The output signal from the delay circuit 54b is fed to a one-line delay circuit 54c and a one-sample delay circuit 56c. The delay circuit 54c delays the input signal by a period corresponding to one horizontal scanning period (1H). The delay circuit 56c delays the input signal by a period corresponding to one sampling period (1T). The output signal from the delay circuit 54c is fed to a one-line delay circuit 54d and a one-sample delay circuit 56d. The delay circuit 54d delays the input signal by a period corresponding to one horizontal scanning period (1H). The delay circuit 56d delays the input signal by a period corresponding to one sampling period (1T). The output signal from the delay circuit 54d is fed to a one-sample delay circuit 56e. The delay circuit 56e delays the input signal by a period corresponding to one sampling period (1T). The output signals from the delay circuits 56a, 56b, 56c, 56d, and 56e are applied to a first input terminal of an adder 58b, a first input terminal of an adder 58a, a plus input terminal of a subtracter 60a, a second input terminal of the adder 58a, and a second input terminal of the adder 58b respectively. The adders 58a and 58b of the type, adding the input data and dividing the resultant sum by two. The subtracter 60a is of the type, subtracting one input data from the other input data and dividing the resultant difference by two. The output signal from the adder 58a is applied to a minus input terminal of the subtracter 60a. The output signal from the subtracter 60a is fed to a one-sample delay circuit 56f. The delay circuit 56f delays the input signal by a period corresponding to one sampling period (1T). The output signal from the delay circuit 56f is applied to a first input terminal of an adder 58c. The output signal from the adder 58b is applied to a plus input terminal of a subtracter 60b. A minus input terminal of the subtracter 60b is subjected to the output signal from the delay circuit 56c. The subtracter 60b is of the type, subtracting one input data from the other input data and dividing the resultant difference by four.

The output signal from the subtracter 60b is applied to a one-sample delay circuit 56g. The delay circuit 56g delays the input signal by a period corresponding to one sampling period (1T). The output signal from the delay circuit 56g is fed to a first input terminal of a multiplier 62. A second input terminal of the multiplier 62 is subjected to the final control signal outputted from the vertical direction LPF 26 (see FIG. 1). The multiplier 62 calculates a value which equals the output data from the delay circuit 56g multiplied by a variable coefficient "k". The coefficient "k" varies between $-\frac{1}{2}$ and $+\frac{1}{2}$ in accordance with the final control signal from the vertical direction LPF 26. The output signal from the multiplier 62 is applied to a second input terminal of the adder 58c. The output signal from the adder 58c is fed to the horizontal direction BPF 16 (see FIG. 1). The pass band width of the vertical direction BPF 14 is varied with the coefficient "k". With respect to a variation in the coefficient "k" between $-\frac{3}{4}$ and $+\frac{1}{2}$, the maximal pass band width is approximately twice the minimal pass band width.

The delay circuits 56a–56g prevent timings from being disordered by processing delays caused in the adders and other elements. In the case where these adders and other elements have adequate processing speeds, the delay circuits 56a–56g may be omitted.

Figure 11:
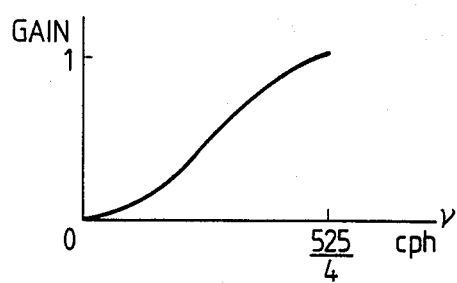
FIG. 11 is a diagram showing characteristics of a main filter of the vertical direction band pass filter of FIG. 9.
Figure 12:
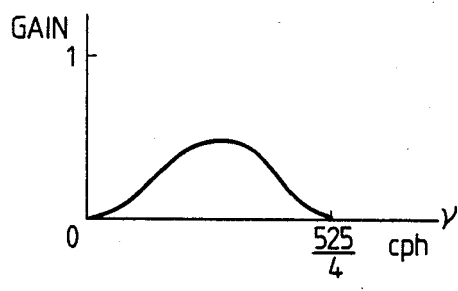
FIG. 12 is a diagram showing characteristics of a sub filter of the vertical direction band pass filter of FIG. 9.
Figure 13:
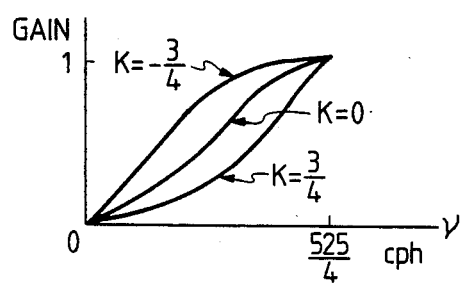
FIG. 13 is a diagram showing characteristics of a combination of the main and sub filters of the vertical direction band pass filter of FIG. 9.

The vertical direction BPF 14 of FIG. 9 includes two filters, that is, a main filter and a sub filter, having a common delay line. The main filter has vertical frequency characteristics as shown in FIG. 11. The sub filter has vertical frequency characteristics of FIG. 12. The sub filter is used to vary the pass band of the BPF 14. The output from the sub filter is multiplied by the motion coefficient "k". The resultant of this multiplication and the output from the main filter are added to form the output from the BPF 14 which is variable with the motion coefficient "k" as shown in FIG. 13.

The horizontal direction BPF 16 is similar to the vertical direction BPF 14 of FIG. 9 except that each of the delay times determined by delay circuits 54a–54d corresponds to two sampling periods (2T).

Figure 10:
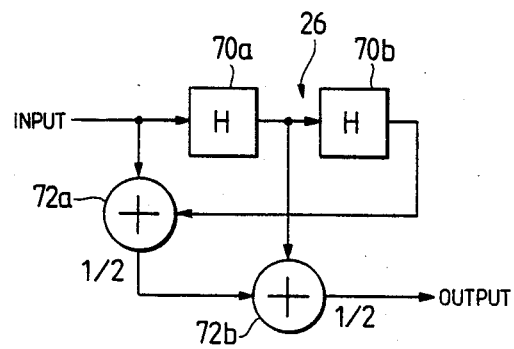
FIG. 10 is a block diagram of the vertical direction low pass filter of FIG. 1.

As shown in FIG. 10, the vertical direction LPF 26 includes a one-line delay circuit 70a into which the primary control signal is inputted from the control signal generator 24 (see FIG. 1). The delay circuit 70a delays the input signal by a period corresponding to one horizontal scanning period (1H). The primary control signal is also applied to a first input terminal of an adder 72a. The output signal from the delay circuit 70a is applied to a one-line delay circuit 70b. The delay circuit 70b delays the input signal by a period corresponding to one horizontal scanning period (1H). The output signal from the delay circuit 70b is applied to a second input terminal of the adder 72a. The output signal from the adder 72a divided by two through an arithmetic shift is fed to a first input terminal of an adder 72b. A second input terminal of the adder 72b is subjected to the output signal from the delay circuit 70a. The adder 72b divides the sum by two through an arithmetic shift and outputs the final control signal which is outputted to the vertical direction BPF 14.

The horizontal direction LPF 28 is similar to the vertical direction LPF 26 of FIG. 10 except that each of the delay times determined by delay circuits 70a and 70b corresponds to two sampling periods (2T).

In cases where an input digital video signal is derived from a PAL signal or an input digital video signal is derived from an NTSC signal through a sampling process using a sampling frequency which differs from four times the color subcarrier frequency, the delay times determined by delay circuits within the BPFs 14 and 16, the variation detectors 20 and 22, and the LPFs 26 and 28 are changed in correspondence with the input digital signal.

As shown in FIG. 1, the vertical direction BPF 14 precedes the horizontal direction BPF 16 in the signal flow. This positional arrangement allows the line delay circuits 54a and 54b of the vertical direction BPF 14 to be used in common as the line delay circuit 42 of the vertical direction variation detector 20. It should be noted that the vertical direction BPF 14 and the horizontal direction BPF 16 may be exchanged in place.

What is claimed is:

1. An adaptive device for separating a luminance signal and a color signal, comprising:
    (a) a combination of a variable vertical-direction band pass filter and a variable horizontal-direction band pass filter, the filter combination extracting a color signal from a composite color signal;
    (b) vertical-direction variation detecting means for detecting a difference between levels of the composite color signal at sampling points separated vertically in a picture;
    (c) horizontal-direction variation detecting means for detecting a difference between levels of the composite color signal at sampling points separated horizontally in a picture;
    (d) control means for controlling pass bands of the vertical-direction band pass filter and the horizontal-direction band pass filter in accordance with output signals from the vertical-direction variation detecting means and the horizontal-direction variation detecting means; and
    (e) means for deriving a luminance signal from the composite color signal and the color signal.

2. The device of claim 1 wherein the control means widens the pass band of the vertical-direction band pass filter and narrows the pass band of the horizontal-direction band pass filter when the detected vertical difference is greater than the detected horizontal difference, and wherein the control means narrows the pass band of the vertical-direction band pass filter and widens the pass band of the horizontal-direction band pass filter when the detected vertical difference is smaller than the detected horizontal difference.

3. The device of claim 1 wherein the control means narrows both of the pass bands of the vertical-direction band pass filter and the horizontal-direction band pass filter when both of the detected vertical difference and the detected horizontal difference are relatively great.

4. The device of claim 1 wherein the control means comprises means for generating an address signal in accordance with the output signals from the vertical-direction variation detecting means and the horizontal-direction variation detecting means, and a memory holding a set of predetermined control signals in respective storage locations, the memory selecting two of the control signals in response to the address signal and outputting the selected control signals to the vertical-direction band pass filter and the horizontal-direction band pass filter.

5. The device of claim 1 wherein the control means generates two primary control signals in accordance with the detected vertical difference and the detected horizontal difference, and wherein the control means comprises a vertical-direction low pass filter and a horizontal-direction low pass filter processing the primary control signals into final control signals fed to the vertical-direction band pass filter and the horizontal-direction band pass filter respectively.

6. The device of claim 1 wherein the vertical-direction band pass filter precedes the horizontal-direction band pass filter in a signal flow.

* * * * *